US008588240B2

(12) United States Patent
Ramankutty et al.

(10) Patent No.: US 8,588,240 B2
(45) Date of Patent: Nov. 19, 2013

(54) METHODS AND SYSTEMS FOR ACCOUNTING IN AN ACCESS GATEWAY (75) Inventors: Rajesh Ramankutty, Nashua, NH (US); Rajesh Velandy, Nashua, NH (US); Sanil Kumar Puthiyandyil, Nashua, NH (US)

(73) Assignee: Cisco Technology, Inc., San Jose, CA (US)

( * ) Notice: Subject to any disclaimer, the term of this patent is extended or adjusted under 35 U.S.C. 154(b) by 742 days.

(21) Appl. No.: 12/575,161

(22) Filed: Oct. 7, 2009

(65) Prior Publication Data

US 2010/0085978 A1 Apr. 8, 2010

Related U.S. Application Data (60) Provisional application No. 61/103,478, filed on Oct. 7, 2008.

(51) Int. Cl.
*H04L 12/28* (2006.01)
*H04L 12/56* (2011.01)

(52) U.S. Cl.
USPC .......................................... 370/401; 370/400

(58) Field of Classification Search
None
See application file for complete search history.

(56) References Cited

U.S. PATENT DOCUMENTS

| | | | |
|---|---|---|---|
| 6,119,160 A | 9/2000 | Zhang et al. | |
| 6,298,383 B1 | 10/2001 | Gutman et al. | |
| 6,512,756 B1 * | 1/2003 | Mustajarvi et al. | ........... 370/341 |
| 6,578,092 B1 | 6/2003 | Lau et al. | |
| 6,792,457 B1 | 9/2004 | Zhang et al. | |
| 7,149,229 B1 | 12/2006 | Leung | |
| 7,346,697 B2 | 3/2008 | Zhang et al. | |
| 7,346,772 B2 | 3/2008 | Rebo et al. | |
| 7,469,294 B1 | 12/2008 | Luo et al. | |
| 7,689,485 B2 | 3/2010 | Kanekar et al. | |
| 7,739,159 B1 | 6/2010 | Chandrupatla et al. | |
| 7,805,127 B2 | 9/2010 | Andreasen et al. | |
| RE41,811 E | 10/2010 | Gutman et al. | |
| 7,817,664 B2 | 10/2010 | Leung | |
| 7,840,215 B2 | 11/2010 | Panda et al. | |
| 7,865,410 B1 | 1/2011 | Chandrupatla et al. | |
| 7,899,918 B1 | 3/2011 | Potter et al. | |
| 7,904,359 B1 | 3/2011 | Viswanath et al. | |
| 7,995,990 B1 | 8/2011 | Andreasen et al. | |
| 2004/0172346 A1 | 9/2004 | Kanekar et al. | |
| 2005/0259650 A1 * | 11/2005 | Bronner et al. | ................ 370/389 |
| 2007/0011329 A1 | 1/2007 | Albert et al. | |
| 2007/0162289 A1 * | 7/2007 | Olsson et al. | ..................... 705/1 |
| 2008/0022392 A1 | 1/2008 | Karpati et al. | |
| 2009/0323635 A1 * | 12/2009 | Gras et al. | ..................... 370/331 |
| 2010/0097981 A1 * | 4/2010 | Kant et al. | ..................... 370/328 |

* cited by examiner

*Primary Examiner* — Jae Y Lee
(74) *Attorney, Agent, or Firm* — Wilmer Cutler Pickering Hale and Dorr LLP (57) ABSTRACT

Methods and systems are disclosed that provide accounting in an access gateway of a communication network. Logic can be implemented in an access gateway to provide accounting in an access gateway when the data is tunneled or encapsulated by a protocol when passing through the access gateway. The access gateway can perform inspections on the data to determine what portions of the data are user payload data and be included in a count and what portions of the data can be ignored, such as control packets and overhead information on the packet. The logic can also be deployed in next generation networks, such as long-term evolution, to provide accounting at the access gateway in some situations.

16 Claims, 4 Drawing Sheets

METHODS AND SYSTEMS FOR ACCOUNTING IN AN ACCESS GATEWAY

CROSS-REFERENCE TO RELATED APPLICATIONS

This application claims benefit under 35 U.S.C. §119(e) of U.S. Provisional Patent Application No. 61/103,478, entitled "Methods and Systems for Accounting in an Access Gateway," filed Oct. 7, 2008, which is hereby incorporated by reference herein in its entirety.

TECHNICAL FIELD OF THE DISCLOSURE

Methods and systems are disclosed that provide accounting in an access gateway of a communication network.

BACKGROUND OF THE DISCLOSURE

Wireless networks are networks that can use both wires and radio waves to carry information from one node in the network to one or more receiving nodes in the network. Cellular telephony is characterized by the use of radio cells that provide radio coverage for a set geographic area, with multiple cells arranged to provide contiguous radio coverage.

The first generation (1G) of wireless telephone technology were analog mobile phones. As technology progressed, a second generation (2G) of wireless service was introduced. The main difference between 1G systems and 2G systems was that radio signals being modulated in 2G were digital. Second generation technologies were primarily based into time division multiplexed access (TDMA) and code division multiplexed access (CDMA). Networks that were upgraded to handle higher-speed data transfer are referred to as 2.5G and 3G networks. The 3rd Generation Partnership Project (3GPP) and the 3rd Generation Partnership Project 2 (3GPP2) respectively developed GSM/UMTS and cdmaOne/CDMA2000 technologies. The next evolution is 4G technology, which is based on long term evolution-system architecture evolution (LTE-SAE).

Wireless communication systems and networks are used in connection with many applications, including, for example, satellite communications systems, portable digital assistants (PDAs), laptop computers, and mobile nodes (e.g., cellular telephones). One significant benefit that users of such applications obtain is the ability to connect to a network (e.g., the Internet) as long as the user is within range of such a wireless communication system.

Current wireless communication systems use either, or a combination of, circuit switching and packet switching in order to provide mobile data services to a mobile node. Generally speaking, with circuit-based approaches, wireless data is carried by a dedicated (and uninterrupted) connection between the sender and recipient of data using a physical switching path. Once the direct connection is set-up, it is maintained for as long as the sender and receiver have data to exchange. The establishment of such a direct and dedicated switching path results in a fixed share of network resources being tied up until the connection is closed. When the physical connection between the sender and the receiver is no longer desired, it is torn-down and the network resources are allocated to other users as necessary.

Packet-based approaches, on the other hand, do not permanently assign transmission resources to a given call, and do not require the set-up and tear-down of physical connections between a sender and receiver of data. In general, a data flow in packet-based approaches is "packetized." That is, the data is divided into separate segments of information, and each segment receives "header" information that may provide, for example, source information, destination information, information regarding the number of bits in the packet, priority information, and security information. The packets are then routed to a destination independently, based on the header information. The data flow may include a number of packets or a single packet.

SUMMARY

Methods and systems are disclosed that provide accounting and charging in an access gateway of a communication network. The accounting and charging can be implemented in an access gateway that tracks the usage by subscribers of network resources and prepares charging records or monitors activity for later charging purposes. The accounting at the access gateway can track data usage even when the data is tunneled or encapsulated or when multiple network anchor points are in use. The access gateway can perform inspections on the data to determine what portions of the data are user payload data and include this data in the accounting records and what portions of the data can be ignored, such as control packets and overhead information on the packet. The logic can also be deployed in next generation networks, such as long-term evolution, to provide accounting at the access gateway in some situations.

In some embodiments, an access gateway is provided that includes a first network connection for communication with a mobile node, a second network connection for communication with a tunnel terminator, a processing unit configured to run logic to inspect data received on the first network connection and the second network connection to determine if the data is encapsulated by a protocol, analyze the received data according to logic to determine if the data includes user payload data and if the data includes non-user payload data, count the user payload data portion of the data and the non-user payload data portion of the data, and generate a formatted record, and a third network connection configured to send the formatted record including the count of the user payload data portion of the data for charging a subscriber for usage of the network.

In other embodiments, a method of accounting data in a communications network is provided that includes receiving data at an access gateway in the communications network, inspecting the data received at the access gateway to determine if the data is being tunneled through the access gateway, analyzing at the access gateway if the data is user payload data, and inspecting the data if more than user payload data is included in the packet, determining the user payload portion of the data and the non-user payload portion of the data, counting the user payload data portion of the data and the non-user payload data portion of the data, generating a formatted record including the count of the user payload data portion, and sending the formatted record to a server to charge a subscriber for usage of the network.

In yet other embodiments, an access gateway is provided that includes a first network connection for communication with user equipment, a second network connection for communication with a first anchor gateway, a third network connection for communication with a second anchor gateway, and a processing unit configured to run logic for inspecting data received on the second network connection from the first anchor gateway and the third network connection from the second anchor gateway to determine if the data is for the same user equipment, wherein the logic performs a mapping if a determination is made that the user equipment is in communication with a plurality of anchor gateways, and wherein the logic tracks packet data sent and received by the anchor gateways on a per-anchor gateway basis, wherein the received data is analyzed on a per-anchor gateway basis according to logic to determine if the data includes user payload data and the processing unit further inspects the data to determine and count the user payload portion of the data for use in charging a subscriber for services.

DETAILED DESCRIPTION OF THE DISCLOSURE

Methods and systems are disclosed that provide accounting and charging in an access gateway of a communication network. The process of accounting and charging in a network allows network operators to bill subscribers and provide various services that can differentiate one network operator from another. In legacy circuit-switched systems a dedicated circuit with a fixed amount of resources was used, so the charging could simply be based on the duration of the circuit usage. In networks utilizing packet applications and packet transmission, the resource available to a subscriber is not necessarily fixed, and so accounting and charging becomes more complex. In a packet-based network, the resources dedicated to a subscriber are inherently flexible based on the amount of packet data being sent and received. As a result, a subscriber's usage of packet data network resources can vary greatly. For example, a subscriber can go through intensive periods of network usage (e.g., watching a video), followed by limited usage such a checking email. The accounting and charging schemes used can also vary and include charging based on data volume, session or connection time, service type (e.g., web, email, video, etc.), the Quality of Service provided, or the type of technology used (e.g., WiFi, 3G, WIMAX, etc.), for example.

The charging process is based on accounting, which includes the collection of various events and information which are stored in a formatted record. The formatted record can be a charging data record (CDR) or another specified format. The access gateway typically has access to much of the information used by a network operator to enable accounting of its subscribers. However, certain protocols can interfere with collection of information at the access gateway because these protocols tunnel subscriber data through the access gateway. As a result, accounting based on data volume becomes more complicated because overhead and other data can be introduced into the packet stream. This additional data can skew the data volumes and interfere with typical accounting procedures by inhibiting accurate accounting. Without accurate accounting, a user could be overcharged. For these protocols, accounting is typically enabled at the tunnel termination point to ensure accurate accounting. However, enabling accounting on the tunnel termination point can be undesirable because, for example, there are the additional costs/overhead. These costs/overhead can include: 1) use of system resources on the tunnel terminator, such as CPU and memory, 2) additional network infrastructure requirements, such as AAA servers, and 3) mechanisms to correlate accounting data between the access gateway and the home agent.

In some embodiments, the access gateway is modified with logic to allow for accounting that would otherwise occur at the tunnel termination point. The logic can provide accurate accounting of the data volume and other information for use in various charging schemes. For example, the logic can provide accounting for the user-payload sent via tunnel-based protocols through the access gateway. The user-payload data includes the data requested or used by a subscriber, such as the data for showing a video on a phone. The user-payload data can include a variety of things, such as web pages, email, voice calls (e.g., voice over IP), video, content downloads, and other types of information. In packet based systems, the payload data can be placed within a packet that includes a header and other information such as error correcting code. The packet can then be encapsulated by one or more tunneling protocols, which makes tracking and counting the user data more difficult because both data packets and other control packets are encapsulated in a similar fashion. The logic can also identify non-user payload data, such as control packets and tunnel overhead on the data-packets, so this non-user payload data is not included in the count of data for which an accounting is made. For example, the logic can identify binding updates (BU) and binding acknowledgments (BA) sent between the home agent (HA) and the user equipment (UE) and not charge the subscriber for this activity, as such updates and acknowledgements are non-user payload data.

In certain embodiments, when this logic is enabled, the logic counts the octets of data passing through the access gateway without regard for what the underlying data is. In addition to this octet-count, the logic uses additional counters. These additional counters can be for separately counting one or more of user-payload packets, user-payload octets, and signaling-overhead. This information can then be sent in separate attributes/AVPs to the Accounting Server where it can be used for charging purposes.

Figure 1:
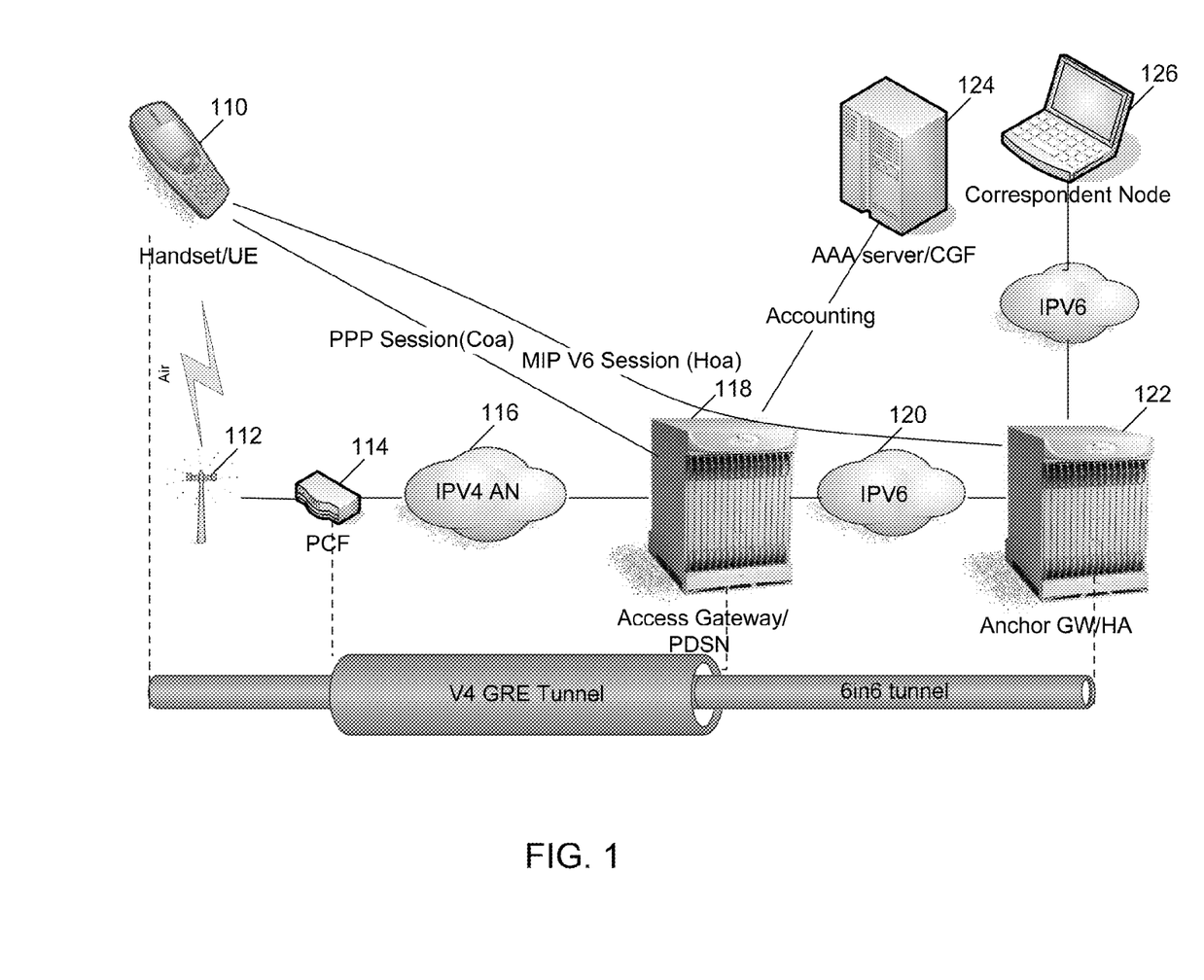
FIG. 1 illustrates a network diagram for a mobile internet protocol version 6 (MIPv6) call in accordance with some embodiments.

FIG. 1 illustrates a typical network diagram for a MIPv6 call in accordance with certain embodiments. The network includes user equipment 110, base station 112, packet control function (PCF) 114, internet protocol version 4 access network (IPv4 AN) 116, access gateway 118, internet protocol version 6 (IPv6) network 120, home agent (HA) 122, authentication, authorization, and accounting (AAA) server/charging gateway function (CGF) 124, and correspondent node 126. As shown, the UE 110 sends IPv6 packets encapsulated in a 6in6 tunnel from the UE 110 to the HA 122. The HA 122 terminates the 6in6 tunnel and sends the packets over an IPv6 network/internet to correspondent node 126. The network diagram illustrates a network that mixes internet protocol version 4 and internet protocol version 6 (IPv6) components, but fully IPv6 networks can be used in some embodiments. In mixed protocol networks, a tunnel can be used to transport IPv6 packets or IPv6 variant protocol packets over an IPv4 network. A version 4 generic routing encapsulation (GRE) tunnel can be used over IPv4 network sections. As described above, packets that are encapsulated in one or more tunnels complicates accounting and can lead to billing issues on network devices where there is tunneling present.

When MIPv6 is implemented in a network, route optimization is used to tunnel information directly to the home agent, which serves as a tunnel termination point. The access gateway, through which the MIPv6 tunnel passes, may not be aware of the MIPv6 tunnel's presence. This can be because the access gateway is connected to UE 110 by point to point protocol (PPP) and the access gateway considers the connection to be a Simple IP (SIP) connection. However, since the connection is really a MIPv6 connection, in some embodiments, the access gateway is not able to properly gather accounting information.

Figure 2:
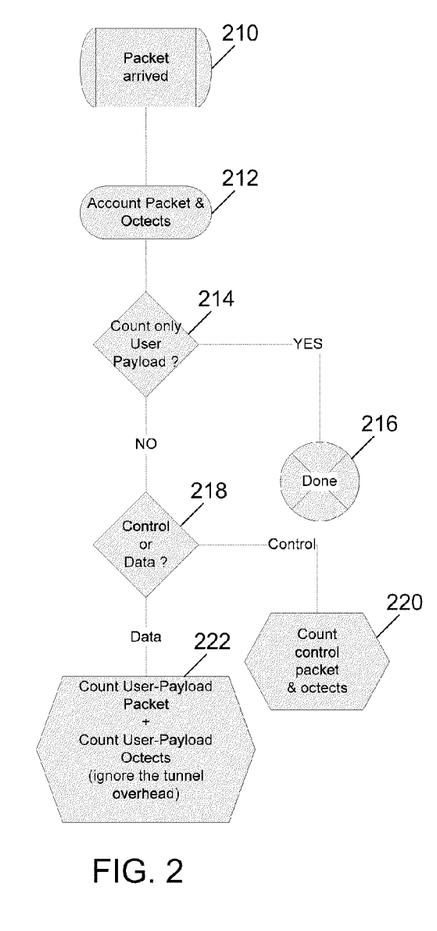
FIG. 2 illustrates a block diagram detailing a process for performing packet based accounting in accordance with some embodiments.

FIG. 2 illustrates a block diagram for implementing logic to perform accounting functionalities at the access gateway in accordance with some embodiments. At 210, a packet arrives at the access gateway. The packet may be encapsulated in a protocol for tunneling purposes. In 212, the access gateway counts the packet and octets. In 214, the access gateway determines what is contained in the packet. This can be performed through deep packet inspection or by extracting software that checks the contents of the packet. If the packet contains user payload, then the packet is properly counted in 212 and the accounting for the packet is done 216. If the packet includes other information besides user payload, then a determination is made about what is included in the packet in 218. If control data is counted in 220, then the control data packet and octets are counted. This information can be used in considering how to charge the user. For example, the number of control packets can be subtracted from the total number of packets and octets counted in 212. If data is found with other overhead information in 222, this overhead information can be ignored and only the user payload packet and octets are counted.

A similar accounting problem can arise in LTE-based networks where certain protocols are used or where the user equipment is accessing multiple packet data networks. The accounting logic can be implemented in an LTE-based network for either or both of these problems. An example of an LTE-based network where a protocol problem exists is where dual stack mobile IPv6 (DSMIPv6) is running The dual stack MIPv6 protocol uses two stacks for the mobile node so the mobile node can run either IPv4 or IPv6. Generally, any protocol running over a communication network where tunneling is used across a network device that is responsible for certain network functions, such as handoffs, can use the accounting logic described herein for accounting purposes. The accounting logic can also be used where route optimization protocols may be used that tunnel data from an anchor (such as a home agent) to a mobile node.

Figure 3:
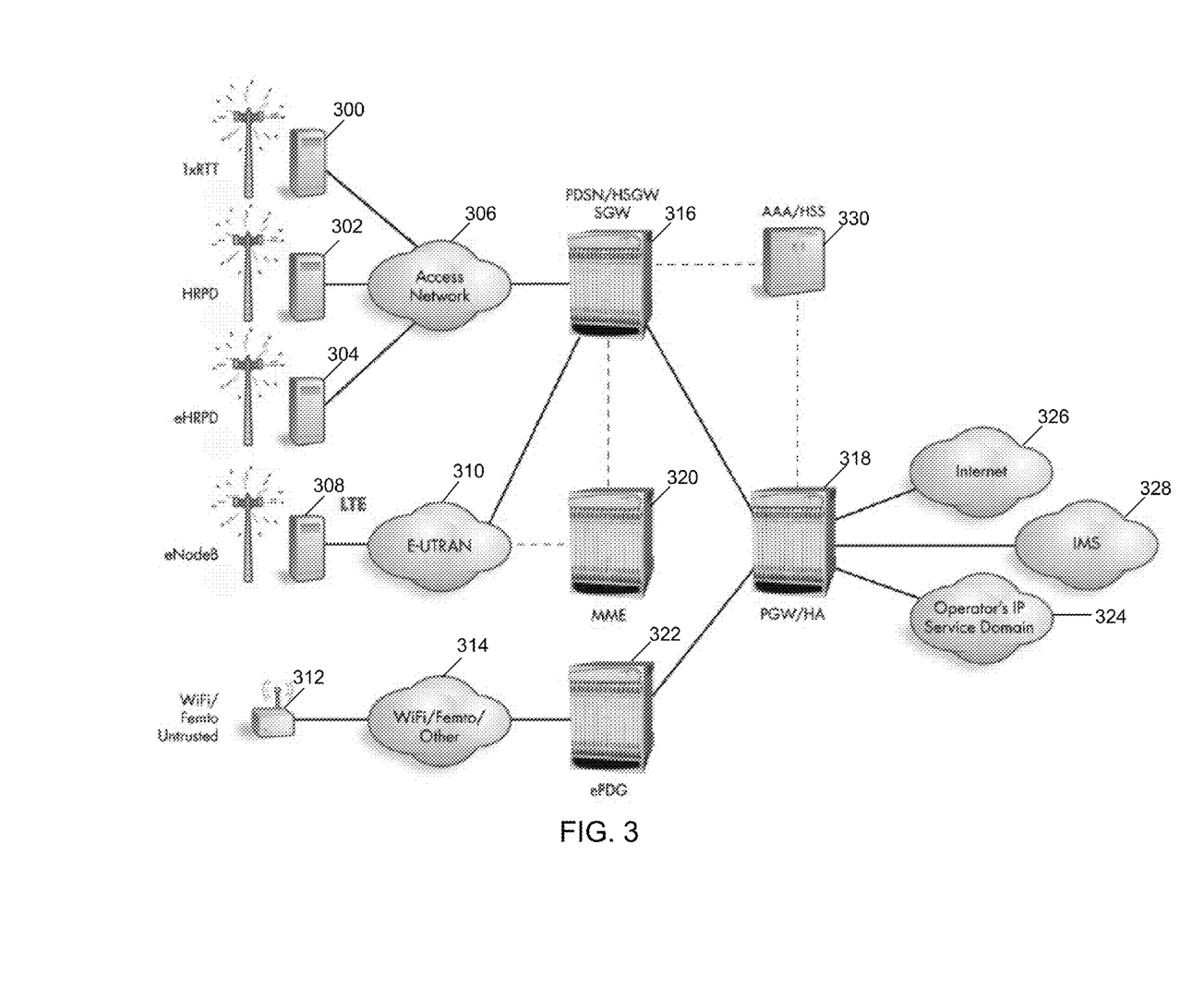
FIGS. 3-4 illustrate a long term evolution (LTE) communication network in accordance with some embodiments.

An example of a situation where user equipment (UE) is accessing multiple packet data networks is where the UE has multiple packet data network gateways (PWGs). Both of these embodiments can be further understood through the descriptions of FIGS. 3 and 4. FIG. 3 illustrates a long-term evolution (LTE) communication network that implements the accounting logic along with legacy CDMA network components in accordance with certain embodiments. The legacy CDMA network can include a 1xRTT transceiver 300, a high-rate packet data (HRPD) transceiver 302, and an evolved high-rate packet data (eHRPD) transceiver 304, each of which can connect to an access network 306. An evolved Node B (eNodeB) transceiver 308 is an LTE network radio network component that connects to an Evolved UMTS Terrestrial Radio Access Network (E-UTRAN) 310. Another radio access point to the network can be a WiFi, Femto, WiMAX or other radio spectrum technology transceiver 312 that connections with a broadband or other access network.

The access network 306 can communicate with an access gateway 316 that implements a combination of functionalities such as a packet data serving node (PDSN), a HRPD serving gateway (HSGW), and a serving gateway (SGW). In operation, the PDSN functionality can be used with 1xRTT 300, the HSGW functionality can be used with HRPD 302 and eHRPD 304, and the SGW functionality can be used with the eNodeB 308. The access gateway 316 can communicate with an anchor gateway 318 which can implement a packet data network gateway (PGW) and a Home Agent (HA) and a mobility management entity (MME) 320. On the access network side, the anchor gateway 318 can also communicate with an evolved packet data gateway (ePDG) 320 which provides connectivity to the WiFi/Femto/other transceiver 312. On the packet core side, the anchor gateway can communicate with the operator's IP service domain 324, the internet 326, and IP multimedia subsystem (IMS) 328. An authentication, authorization, and accounting (AAA) server/home subscriber server (HSS) 330 can communicate with the access gateway 316, the anchor gateway 318, or both.

The Home Subscriber Server (HSS) can be a master user database that supports IMS network entities that handle calls. The HSS stores subscription-related information (subscriber profiles), performs authentication and authorization of the user, and can provide information about the subscriber's location and IP information. The AAA server can provide authentication, access control, and accounting to the network. The authentication can involve verification of the subscriber, the access control can involve granting or denying access to specific services, and the accounting that can take place is the tracking of the use of network resources by subscribers. Other servers, such as the Home Location Register (HLR) can be used in other embodiments. In certain embodiments, the AAA/HSS 330 can communicate with the access gateway 316 for charging purposes.

In some embodiments, the accounting logic can be used for accounting to be enabled at the access gateway 316 instead of the anchor gateway 318 in an LTE network. This can occur, for example, with certain protocols and when multiple packet data networks are being accessed by the UE. In LTE, the UE can be assigned multiple IP addresses by each PGW and access a different packet data network from each PGW. In such embodiments, accounting can be enabled on both the access gateway 316 and the anchor gateway 318, or the accounting logic can be enabled just on the access gateway 316. If the accounting logic is enabled on the access gateway 316, then accounting can be turned off on the anchor gateways 318. The accounting logic can be modified in the embodiment where there are multiple anchor gateways 318 so that a separate database or entry in the logic is kept for each PGW or anchor gateway. This can be done so the accounting at the access gateway is performed on a anchor gateway basis and the access gateway can map up each packet flow with the anchor gateway it originated from for accounting purposes. The logic can run through the table described in FIG. 2 on a per anchor gateway basis. This can allow the logic to provide more granularity in the accounting information so that the operator can chose to vary the pricing depending on the packet data network or the services on the various networks.

In operation, a processor in the gateway can be used to determine when a UE is connected to multiple packet data networks. This can be determined through deep packet inspection or by filtering to determine when a UE has obtained more than one IP address or is communicating with multiple anchor gateways. The UE can be identified by a international mobile subscriber identity/temporary mobile subscriber identity (IMSI/TMSI), a Mobile Subscriber ISDN Number (MSISDN), International Mobile Equipment Identity (IMEI), a Mobile Equipment Identifier (MEIG), or any other suitable identification information. When the processor in conjunction with the logic discovers that a particular UE is in communication or has setup communication with more than one anchor gateway, the logic can set up a structure to track the anchor gateways the UE is in communication with, and map the packet data to a particular anchor gateway. The mapping can be performed by using addressing or identification information of the anchor gateway to identify the packet stream so the accounting can be performed on a per-anchor gateway basis. While the same accounting may be performed for each anchor gateway, the accounting can also be different if there are certain tunnels or other actions that are occurring with a particular anchor gateway. The pricing may also be different depending on the packet data network. The inspection of packet data originating from each anchor gateway can also undergo a different inspection depending on how the packet data is being communicated. Accounting rules can be implemented in the logic that are particular to an anchor gateway. These rules can be used to specify how packet data is analyzed and how the accounting is performed with packet data from a particular anchor gateway. The accounting information can then be sent from the access gateway on a per-anchor gateway basis or in a combined fashion to a server for later billing to the subscriber.

The LTE communication network includes a PDN gateway (PGW), a serving gateway (SGW), an E-UTRAN (evolved-UMTS terrestrial radio access network), and a mobility management entity (MME). The SGW sits in the user plane where it forwards and routes packets to and from the eNodeB and Packet Data Network Gateway (PGW). The SGW also serves as the local mobility anchor for inter-eNodeB handover and mobility between 3GPP networks. The PGW acts as the interface between the LTE network and other packet data networks, such as the Internet or SIP-based IMS networks (fixed and mobile). The PGW serves as the anchor point for intra-3GPP network mobility, as well as mobility between 3GPP and non-3GPP networks. The PGW acts as the Policy and Charging Enforcement Function (PCEF), which manages Quality of Service (QoS), online/offline flow-based charging data generation, deep-packet inspection, and lawful intercept.

The ePDG is responsible for interworking between the EPC and fixed non-3GPP networks that require secure access, such as a WiFi, LTE metro, and femtocell access networks. The ePDG uses IPSec/IKEv2 for secure access to the EPC network. Optionally, the ePDG can use Proxy Mobile IPv6 (PMIPv6) to interact with the Packet Data Network Gateway (PGW) when the mobile subscriber is roaming in an untrusted non-3GPP system. The ePDG is involved in tunnel authentication and authorization, transport level packet marking in the uplink, policy enforcement of Quality of Service (QoS) based on information received via Authorization, Authentication, Accounting (AAA) infrastructure, lawful interception, and other functions.

The MME resides in the EPC control plane and manages session states, authentication, paging, mobility with 3GPP 2G/3G nodes, roaming, and other bearer management functions. The MME can be a standalone element or integrated with other EPC elements, including the Serving Gateway (SGW), Packet Data Network Gateway (PGW), and Release 8 Serving GPRS Support Node (SGSN). The MME can also be integrated with 2G/3G elements, such as the Serving GPRS Support Node (SGSN) and Gateway GPRS Support Node (GGSN). This integration is the key to mobility and session management interworking between 2G/3G and 4G mobile networks.

Figure 4:
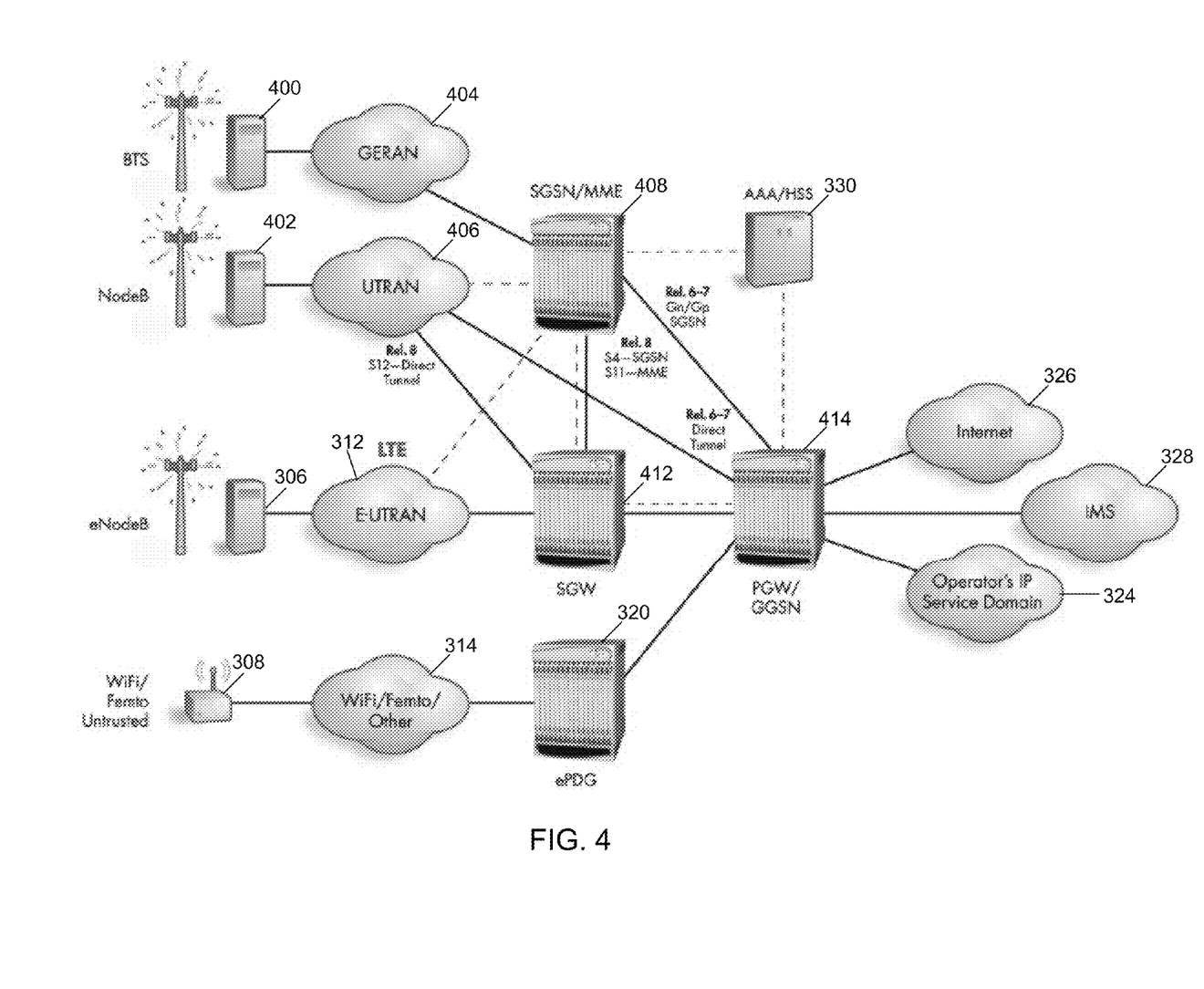

FIG. 4 illustrates a long-term evolution (LTE) communication network that implements the accounting logic along with legacy universal mobile telecommunications systems (UMTS) network components in accordance with certain embodiments. The legacy transceivers include base transceiver station (BTS) 400 and NodeB transceiver 402. The BTS 400 can communicate with a GSM EDGE Radio Access Network (GERAN) 404 and the NodeB 402 can communicate with a UMTS terrestrial radio access network (UTRAN) 406. The serving GPRS support node (SGSN) can be implemented on a gateway 408 with an mobility management entity(MME). The GERAN 404 can communicate through the SGSN functionality on gateway 408 to serving gateway (SGW) 412 or gateway GPRS support node (GGSN)/PWG 414. In some embodiments either SGSN 408 or SGW 412 can be the access gateway where the accounting logic is implemented and PGW 414 can be the anchor gateway. For example, as described above, where the UE is connected to multiple PGWs 414 the accounting can be implemented on the SGW 412 using the accounting logic described.

The logic can be implemented as a software or hardware based solution, or a combination of hardware and software. For logic implemented in software, it is stored in a computer readable medium, such as a memory or storage device, and executed by a processor. The accounting can be implemented on a non-tunnel terminating device on behalf of the tunnel terminating device. The logic implemented on the access gateway can count the user-payload data in a counter. The logic can include other aspects such a database linking other user information to the accounting information. Other accounting information, such as handoff information from one access gateway to a second access gateway, can be included in the accounting information. The logic can perform computations on the accounting information obtained from deep packet inspection or other mechanisms to determine the user payload information delivered to the user, so that the user can be charged properly for this information.

The access gateway can also implement other charging services, report this information to other servers, and enforce subscriber policies. The charging can be implemented using one or more metrics such as time based, volume based (e.g., packet amount, number of bytes, per destination, etc.), content based (e.g., messaging, e-mail, application download, game session, etc.), event based (e.g., quantity of file downloads or actual video streaming play time), and/or transaction type based (pre-paid, reverse billing, browsing 'in-network' or 'out-of-network', etc.). The accounting information can also be used for reverse destination-based billing, which enables the mobile carrier to generate new revenue streams by billing advertisers, portals, or content providers when transactions from the subscriber reach those particular sites. The access gateway can also communicate with other servers or network devices to report the accounting or charging information. For example, for prepaid subscribers the access gateway can exchange accounting and other charging information using RADIUS or DIAMETER to a quota control server. This communication can be used to prevent usage when prepaid credit has run out, and can be used to notify the subscriber that they need to add credit to their account. The access gateway can also communicate with postpaid servers such as charging gateway functions (CGF) or a charging data functions (CDF). In some embodiments, the charging functions can be implemented on the access gateway.

The access gateway and anchor gateway described above can be implemented on a gateway. The gateway can perform multiple and different integrated functionalities. In some embodiments, a packet data network gateway (PGW), a serving gateway (SGW), Gateway General packet radio service Support Node (GGSN), a serving GPRS support node (SGSN), a packet data serving node (PDSN), a foreign agent (FA), or home agent (HA) can be implemented on a gateway. Other types of functionalities can also be implemented on a gateway in other embodiments are a packet data inter-working function (PDIF), an access service network gateway (AS- NGW), a base station, a access network, a User Plane Entity (UPE), an IP Gateway, an mobility management entity (MME), a packet data network gateway (PGW), a serving gateway (SGW), a session initiation protocol (SIP) server, a proxy-call session control function (P-CSCF), and an inter-rogating-call session control function (I-CSCF). In certain embodiments, one or more of the above-mentioned other types of functionalities are integrated together or provided by the same gateway.

The gateway can also support sessions originated from a Femto base station, which would connect to the gateway using a broadband network. A person or corporation may use a Femto base station in a home or business to support one or more mobile nodes. The gateway can provide trigger based traffic management during a handoff from a Femto base station to a macro base station, while maintaining traffic management for the mobile node. In certain embodiments, a gateway device is provided by Starent Networks, Corp. of Tewksbury, Mass. on an ST16 or ST40 multimedia platform.

The gateway device can include slots for loading application cards and line cards. A midplane can be used in the gateway device to provide intra-gateway communications, power connections, and transport paths between the various installed cards. The midplane can include buses such as a switch fabric, a control bus, a system management bus, a redundancy bus, and a time division multiplex (TDM) bus. The switch fabric is an IP-based transport path for user data throughout the gateway device implemented by establishing inter-card communications between application cards and line cards. The control bus interconnects the control and management processors within the gateway device. The gateway device management bus provides management of system functions such as supplying power, monitoring temperatures, board status, data path errors, card resets, and other failover features. The redundancy bus provides transportation of user data and redundancy links in the event of hardware failures. The TDM bus provides support for voice services on the system.

The gateway device supports at least two types of application cards: a switch processor card and a packet accelerator card. The switch processor card serves as a controller of the gateway device and is responsible for such things as initializing the gateway device and loading software configurations onto other cards in the gateway device. The packet accelerator card provides packet processing and forwarding capabilities. Each packet accelerator card is capable of supporting multiple contexts. Hardware engines can be deployed with the card to support parallel distributed processing for compression, classification traffic scheduling, forwarding, packet filtering, and statistics compilations.

The packet accelerator card performs packet-processing operations through the use of control processors and a network processing unit (NPU). The network processing unit determines packet processing requirements; receives and transmits user data frames to/from various physical interfaces; makes IP forwarding decisions; implements packet filtering, flow insertion, deletion, and modification; performs traffic management and traffic engineering; modifies/adds/strips packet headers; and manages line card ports and internal packet transportation. The control processors, also located on the packet accelerator card, provide packet-based user service processing. The line cards when loaded in the gateway device provide input/output connectivity and can also provide redundancy connections as well.

In some embodiments, a ST40 embodiment of the gateway device can support a system management card (SMC) and a packet services card (PSC). The system management card is a system control and management card for managing and controlling other cards in the gateway device. The packet services card is a high-speed processing card that provides multi-threaded point-to-point, packet data processing, and context processing capabilities, among other things.

The operating system software can be based on a Linux software kernel and run specific applications in the gateway device such as monitoring tasks and providing protocol stacks. The software allows gateway resources to be allocated separately for control and data paths. For example, certain packet accelerator cards can be dedicated to performing routing or security control functions, while other packet accelerator cards are dedicated to processing user session traffic. As network requirements change, hardware resources can be dynamically deployed to meet the requirements in some embodiments. The system can be virtualized to support multiple logical instances of services, such as technology functions (e.g., a PDSN, ASNGW, PDIF, HA, GGSN, HSGW, or IPSG).

The gateway device's software can be divided into a series of tasks that perform specific functions. These tasks communicate with each other as needed to share control and data information throughout the gateway device. A task is a software process that performs a specific function related to system control or session processing. Three types of tasks operate within the gateway device in some embodiments: critical tasks, controller tasks, and manager tasks. The critical tasks control functions that relate to the gateway's ability to process calls such as gateway initialization, error detection, and recovery tasks. The controller tasks mask the distributed nature of the software from the user and perform tasks such as monitor the state of subordinate manager(s), provide for intra-manager communication within the same subsystem, and enable inter-subsystem communication by communicating with controller(s) belonging to other subsystems. The manager tasks can control system resources and maintain logical mappings between system resources.

Individual tasks that run on processors in the application cards can be divided into subsystems. A subsystem is a software element that either performs a specific task or is a culmination of multiple other tasks. A single subsystem can include critical tasks, controller tasks, and manager tasks. Some of the subsystems that can run on a gateway device include a system initiation task subsystem, a high availability task subsystem, a recovery control task subsystem, a shared configuration task subsystem, a resource management subsystem, a virtual private network subsystem, a network processing unit subsystem, a card/slot/port subsystem, and a session subsystem.

The system initiation task subsystem is responsible for starting a set of initial tasks at system startup and providing individual tasks as needed. The high availability task subsystem works in conjunction with the recovery control task subsystem to maintain the operational state of the gateway device by monitoring the various software and hardware components of the gateway device. Recovery control task subsystem is responsible for executing a recovery action for failures that occur in the gateway device and receives recovery actions from the high availability task subsystem. Shared configuration task subsystem provides the gateway device with an ability to set, retrieve, and receive notification of gateway configuration parameter changes and is responsible for storing configuration data for the applications running within the gateway device. Resource management subsystem is responsible for assigning resources (e.g., processor and memory capabilities) to tasks and for monitoring the task's use of the resources.

Virtual private network (VPN) subsystem manages the administrative and operational aspects of VPN-related entities in the gateway, which include creating separate VPN contexts, starting IP services within a VPN context, managing IP pools and subscriber IP addresses, and distributing the IP flow information within a VPN context. In some embodiments, within the gateway device, IP operations are done within specific VPN contexts. The network processing unit subsystem is responsible for many of the functions listed above for the network processing unit. The card/slot/port subsystem is responsible for coordinating the events that occur relating to card activity such as discovery and configuration of ports on newly inserted cards and determining how line cards map to application cards. The session subsystem is responsible for processing and monitoring a mobile subscriber's data flows in some embodiments. Session processing tasks for mobile data communications include: A10/A11 termination for CDMA networks, GSM tunneling protocol termination for GPRS and/or UMTS networks, asynchronous PPP processing, packet filtering, packet scheduling, Difsery codepoint marking, statistics gathering, IP forwarding, and AAA services, for example. Responsibility for each of these items can be distributed across subordinate tasks (called managers) to provide for more efficient processing and greater redundancy. A separate session controller task serves as an integrated control node to regulate and monitor the managers and to communicate with the other active subsystem. The session subsystem also manages specialized user data processing such as payload transformation, filtering, statistics collection, policing, and scheduling.

In some embodiments, the software needed for implementing a process or a database includes a high level procedural or an object-orientated language such as C, C++, C#, Java, or Perl. The software may also be implemented in assembly language if desired. Packet processing implemented in a gateway device can include any processing determined by the context. For example, packet processing may involve high-level data link control (HDLC) framing, header compression, and/or encryption. In certain embodiments, the software is stored on a computer readable medium or device such as read-only memory (ROM), programmable-read-only memory (PROM), electrically erasable programmable-read-only memory (EEPROM), flash memory, or a magnetic disk that is readable by a general or special purpose-processing unit to perform the processes described in this document.

Other embodiments are within the following claims. For example, the AAA server could be combined with or co-located with an access gateway.

We claim:

1. An access gateway in a communications network comprising:
   a first network connection for communication with a mobile node;
   a second network connection for communication with a tunnel terminator;
   a processing unit configured to run logic to
      determine if data received on the first network connection and the second network connection is encapsulated by a protocol, by performing packet inspection on the data, and
      if the data is encapsulated by the protocol,
         determine if the received data includes user payload data,
         count the user payload data portion of the data,
         determine if the received data includes non-user payload data,
         count the non-user payload data portion of the data,
         generate a formatted record; and
   a third network connection configured to send the formatted record including the count of the user payload data portion of the data for charging a subscriber for usage of the network, so as to avoid charging the subscriber for the non-user payload data.

2. The access gateway of claim 1, wherein the data received at the access gateway is data tunneled from the mobile node to a tunnel terminator.

3. The access gateway of claim 2, wherein the tunnel terminator is at least one of a home agent and a packet data network gateway (PGW).

4. The access gateway of claim 1, wherein the data received at the access gateway was sent from the mobile node using mobile IP version 6 (MIPv6).

5. The access gateway of claim 1, wherein the logic to inspect the received data performs deep packet inspection.

6. A method of accounting data in a communications network comprising:
   receiving data at an access gateway in the communications network;
   determining if data received at the access gateway is being tunneled through the access gateway;
   if the data is being tunneled,
      analyzing at the access gateway if the data is user payload data, and inspecting the data if more than user payload data is included in the packet;
      determining the user payload portion of the data;
      counting the user payload data portion of the data;
      determining the non-user payload portion of the data;
      counting the non-user payload data portion of the data;
      generating a formatted record including the count of the user payload data portion; and
      sending the formatted record to a server to charge a subscriber for usage of the network, so as to avoid charging the subscriber for the non-user payload data.

7. The method of claim 6, wherein the data is tunneled through the access gateway using mobile IP version 6 (MIPv6).

8. The method of claim 6, wherein the access gateway is at least one of a packet data serving node (PDSN), a high rate packet data (HRPD) serving gateway (HSGW), and a serving gateway (SGW).

9. The method of claim 6, wherein the inspecting to determine if the data is being tunneled uses deep packet inspection.

10. An access gateway in a communications network comprising:
    a first network connection for communication with user equipment;
    a second network connection for communication with a first anchor gateway;
    a third network connection for communication with a second anchor gateway; and
    a processing unit configured to run logic for determining if data received on the second network connection from the first anchor gateway and the third network connection from the second anchor gateway is for the same user equipment, by performing packet inspection on the data, wherein the logic performs a mapping if a determination is made that the user equipment is in communication with a plurality of anchor gateways, and wherein the logic tracks packet data sent and received by the anchor gateways on a per-anchor gateway basis,
    wherein the received data is analyzed on a per-anchor gateway basis according to logic to determine if the data includes user payload data and non-user payload data, and the processing unit further inspects the data to determine and count the user payload portion of the data for use in charging a subscriber for services, determine and count the non-user payload data, and generate a formatted record including the count of the user payload data portion to be sent to a server to charge a subscriber for usage of the network, so as to avoid charging the subscriber for the non-user payload data.

11. The access gateway of claim 10, wherein the access gateway is a serving gateway (SGW) and the first and second anchor gateways are packet data network gateways (PGWs).

12. The access gateway of claim 10, wherein the data received at the access gateway from the first anchor gateway is data tunneled from the mobile node to a tunnel terminator.

13. The access gateway of claim 10, wherein the logic to determine if the data is for the same user equipment performs at least one of deep packet inspection and packet filtering.

14. The access gateway of claim 10, wherein the processing unit charges the subscriber different amounts at least in part based on data received from different packet data networks (PDNs) in communication with the first and second anchor gateways.

15. The access gateway of claim 10, wherein the received data is analyzed according to different logic per anchor gateway to determine if the data includes user payload data and non-user payload data.

16. The access gateway of claim 10, wherein the data is inspected differently per anchor gateway to determine and count the user payload portion of the data for use in charging a subscriber for services.

* * * * *